Aug. 9, 1960      H. E. BARNES      2,948,492
AIRFOIL WITH ADJUSTABLE THROUGH PASSAGE

Filed Oct. 19, 1956      2 Sheets-Sheet 1

Inventor:
Harry E. Barnes

Aug. 9, 1960    H. E. BARNES    2,948,492
AIRFOIL WITH ADJUSTABLE THROUGH PASSAGE
Filed Oct. 19, 1956    2 Sheets-Sheet 2
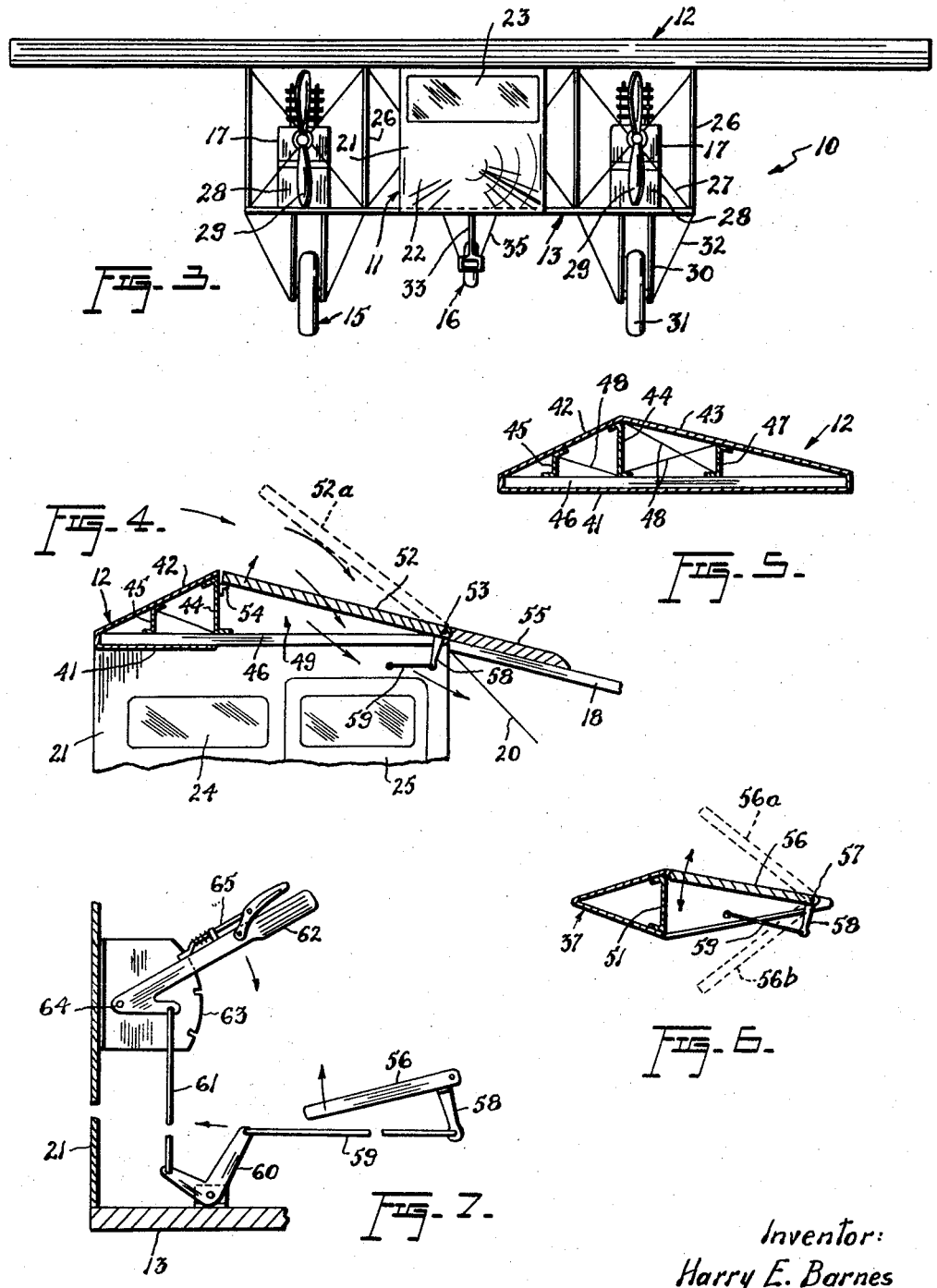
Inventor:
Harry E. Barnes United States Patent Office 2,948,492
Patented Aug. 9, 1960

2,948,492

AIRFOIL WITH ADJUSTABLE THROUGH PASSAGE

Harry E. Barnes, Glendale, Calif., assignor of one-tenth to Gadget-Of-The-Month Club, Inc., North Hollywood, Calif., a corporation of California Filed Oct. 19, 1956, Ser. No. 617,142

2 Claims. (Cl. 244—42)

This invention relates to new and useful improvements in aircraft, particularly airplanes, and the principal object of the invention is to provide an airplane wherein the engine power is utilized primarily for lift purposes rather than for forward propulsion purposes, so that by virtue of its unusually high lift ability the airplane is capable of hovering, if desired, and efficient vertical positional control at low speeds of forward travel.

The above object is attained by providing the wing and horizontal stabilizers of the tail empennage of the airplane with hinged flaps which may be swung to a forwardly and upwardly inclined position so that the undersides thereof deflect in a downward direction a portion of current of air passing along the upper surfaces of the wing and tail empennage during flight of the airplane, the downward deflection of the air current against the underside of such flaps producing a high lifting action to sustain the airplane in the air, even in a hovering position.

An important features of the invention resides in the above outlined flap arrangement which is capable of a high lifting action with the expenditure of a relatively small amount of power, so that the airplane may be powered by comparatively small and light engines.

Another important feature of the invention resides, as aforesaid, in permitting the airplane to hover or travel forwardly at slow speeds, so that it may be effectively employed for observation or rescue purposes.

Another important feature of the invention involves the overall arrangement and relationship of the airplane wings, fuselage, tail empennage and engines, which coact with the aforementioned flaps in facilitating the high lift and slow speed facilities of the aircraft, the same being very simple in construction and light in weight so that the airplane is inexpensive to manufacture and very easy to operate, even by relatively inexperienced persons.

With the foregoing objects and features in view and such other objects and features as may become apparent as this specification proceeds, the invention will be understood from the following description taken in conjunction with the accompanying drawings, wherein like characters of reference are employed to designate like parts, and wherein:

Figure 3 is a front elevational view of the same;

Figure 4 is a fragmentary sectional view, taken substantially in the plane of the line 4—4 in Figure 2;

Figure 5 is a fragmentary sectional view, taken substantially in the plane of the line 5—5 in Figure 2;

Figure 6 is a fragmentary sectional view, taken substantially in the plane of the line 6—6 in Figure 2; and Figure 7 is an elevational view on an enlarged scale, showing a typical arrangement of a control for the flaps of the airplane.

Figure 1:
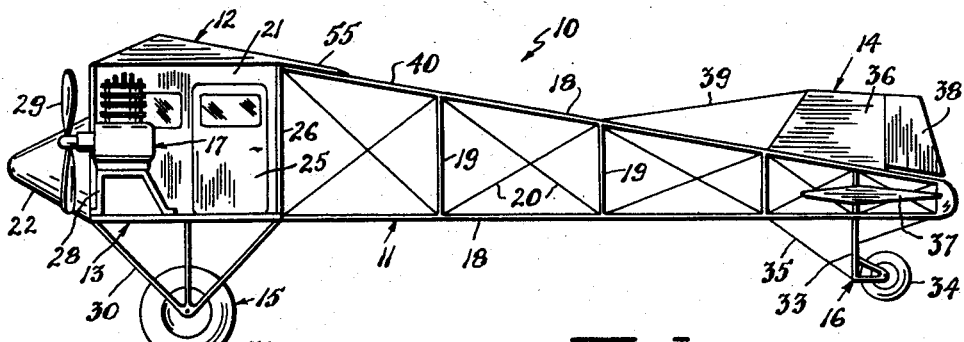
Figure 1 is a side elevational view of an airplane in accordance with the invention.

Referring now to the accompanying drawings in detail, the airplane constructed in accordance with the invention is designated generally by the reference numeral 10 and, broadly, comprises a fuselage 11, a main wing 12, an auxiliary wing 13, tail empennage 14, a pair of front wheel assemblies 15, a tail wheel unit 16 and two engines 17.

In accordance with conventional practice, the fuselage 11 is fabricated from longitudinal members 18 and connecting members 19, which may be in the form of tubes, angle bars or channels of suitable metal such as aluminum, or the like, or wooden construction may be employed if preferred. The members 18, 19 are reinforced by cross braces 20 of wire.

The main wing 12 is disposed at the top of the front end portion of the fuselage 11 and continues without interruption from one side to the other. The auxiliary wing 13 is disposed below the main wing at the bottom of the front portion of the fuselage and is considerably shorter than the main wing, as is best shown in Figure 3. The portion of the fuselage between the wings 12, 13 is enclosed by suitable panelling or sheeting so as to provide a cabin 21, equipped at the front thereof with a pointed nose-piece 22. A windshield 23 is provided at the front of the cabin above the nose-piece, while the sides of the cabin are equipped with suitable windows 24 and a door 25.

The auxiliary wing 13 projects to both sides of the fuselage 11 and is rigidly connected to the main wing 12 by vertical struts 26 and wire braces 27. The intermediate portion of the auxiliary wing 13 forms the bottom or floor of the cabin 21, while the aforementioned engines 17 are carried by the outboard portions of the auxiliary wing on suitable mounting brackets 28. Thus, the engines are disposed between the main and the auxiliary wings and each engine is provided with a propeller 29, which may be of any desired size, adapted to sustain the airplane in flight. It should be understood that during flight of the airplane, an air current will flow rearwardly past the wings 12, 13 and the tail empennage 14 along both upper and lower surfaces thereof.

The front wheel assemblies 15 are secured to the underside of the auxiliary wing 13 under the respective engines 17, each assembly consisting of a frame undercarriage 30 having a wheel 31 rotatable therein and reinforced to the wing 13 by suitable braces 32. Similarly, the tail wheel unit 16 comprises a bracket 33 depending from the fuselage and carrying a rotatable wheel 34, the bracket 33 being reinforced to the fuselage by suitable braces 35.

The tail empennage 14 includes a pair of horizontal stabilizers 37 projecting to opposite sides of the fuselage, a vertical fin or stabilizer 36 and a rudder 38 hinged to the latter, as will be clearly apparent. The rudder 38 is actuated by remote control from the cabin 21 in any suitable conventional manner, and conventional controls are also provided in the cabin for the engines 17. The fin 36 of the tail empennage is reinforced to the fuselage by a suitable brace wire 39.

While the sides and bottom of the fuselage rearwardly of the cabin 21 may be left open, the top thereof is preferably equipped with panelled covering 40 which slants downwardly and rearwardly with the contour of the fuselage as shown and thereby offers a sustaining surface at its underside for the rearward air stream occurring during flight to assist in imparting a lift to the airplane during flight.

With reference to Figures 4 and 5, it will be noted that the main wing 12 is of a substantially triangular cross-section, having a flat lower surface 41 and peaked front and rear upper surface portions 42, 43 respectively. Under the peak of these upper portions there is provided a main spar 44 of a substantially Z-shaped cross-section which extends the full length of the wing. A similar but smaller spar 45 is provided under the front upper portion 42, the same also extending the full length of the wing. The spars 44, 45 have their lower flanges secured to a set of transversely spaced, forwardly and rearwardly extending bars or members 46 and the wing is covered with suitable panelling, as shown. Provided under the rear upper wing portion 43 is a spar 47, similar to the spar 45, and the spars 44, 45 and 47 are reinforced by suitable bracing wires 48.

Figure 2:
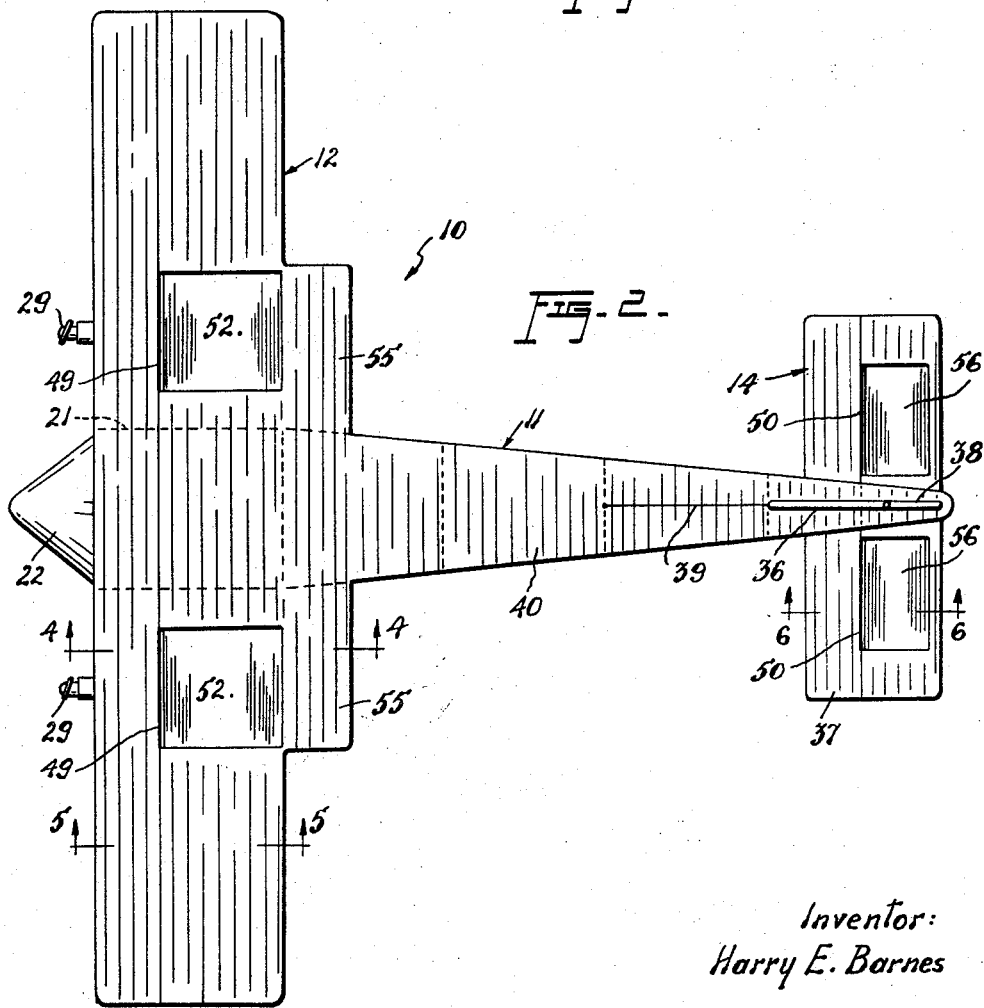
Figure 2 is a top plan view thereof.

The essence of novelty in the invention resides in forming the wing 12 and the tail stabilizers 37 at opposite sides of the fuselage with sets of rectangular air passages 49, 50, respectively, the passages 49 in the wing being in substantial fore and aft alignment, as seen in top plan view, with the engines 17, while the stabilizer passages 50 are disposed closer to the fuselage than the passages 49, as is best shown in Figure 2. Where these passages are formed in the wing 12, the spar 47 is interrupted and covering is left off at both the upper and lower wing surfaces. A somewhat similar construction exists in the stabilizers 37 which, as is shown in Figure 6, are of a diamond-shaped cross-section and supported by a channel-shaped spar 51.

A flat flap 52, preferably of metal, is disposed in each of the wing passages 49 and occupies substantially the same area as the latter. A hinge pin 53 extends through the rear edge portion of the flap 52 and swingably attaches the same to the wing so that the flap may be swung from its initial position shown by the full lines in Figure 4 to a forwardly and upwardly inclined position relative to the wing, as indicated by the dotted lines 52a. Suitable stops or rests 54 may be provided on the spar 44 for supporting the flaps 52 in their initial position wherein they are substantially co-planar with the rear upper portions 43 of the wing, and means hereinafter described are employed for swinging the flaps to and from the position indicated at 52a. As is best shown in Figure 2, the wing 12 is provided at the rear edge thereof with rigid extensions 55 which are disposed at the opposite sides of the fuselage and extend laterally outwardly therefrom to a sufficient extent as to be disposed behind the openings 49 and the flaps 52 therein.

Similar flaps 56 are disposed in the air passages 50 of the stabilizers 37, to which they are swingably attached at their rear edges by horizontal hinge pins 57. The flaps 56 normally lie in the plane of the rear upper portions of the stabilizers, but may be swung from this initial position selectively to a forwardly and upwardly inclined position shown by the dotted lines 56a, and to a forwardly and downwardly inclined position shown by the dotted lines 56b.

As shown in the accompanying drawings, the flaps 52, 56 are provided with crank arms 58 having push and pull rods 59 connected thereto, whereby the flaps may be swung on their hinge rods to the desired position. The rods 59, in turn, are operatively connected by suitable linkage 60, 61 to a control lever 62, or a group of such levers in the cabin 21, for manipulation by the operator of the aircraft. Each of the levers 62 is movable over a notched quadrant 63 to which it is pivoted as at 64, and a conventional spring-controlled latch mechanism 65 is provided on the lever for cooperation with the notched quadrant so as to lock the lever as well as the flap controlled thereby in a predetermined position. If preferred, the flap control mechanism as above described may be substituted by pairs of oppositely acting push and pull cables connected to cranks on opposite sides of each flap, in accordance with conventional practice.

In any event, the controls, particularly the linkage 59, 60, are preferably arranged in such manner that the two flaps 52 on the wing 12 are actuated simultaneously in the same direction, and the stabilizer flaps 56 are also actuated simultaneously in the same direction, but independently of the flaps 52 and vice versa.

When the airplane is in operation and maximum lift is desired, the controls are actuated so as to raise the flaps 52 to the position 52a and the flaps 56 to the position 56a. A portion of the rearward current of air or air stream moving relative to the upper surfaces of the wing 12 and tail empennage 14 will be deflected by the underside of the flaps 52, 56 through the air passages 49, 50, respectively, and in so doing, will exert an upward pressure on the flaps and impart a high degree of lift thereto, sufficient to raise the aircraft to virtually any desired degree and, also, to sustain it in a hovering position, even without any forward movement. The amount of this lifting force may be controlled by partially closing the flaps, if desired, in which event the lifting force will be somewhat diminished and said air stream will be, to a greater degree, utilized for forward propulsion of the aircraft at low speed, such as for example, at the rate of 5 miles per hour.

In this manner, a simple manipulation of the flaps will afford a control for both sustentation in air and forward propulsion and with the flaps in their fully raised position, the aircraft will hover without any forward movement at all. Moreover, by the use of the flaps 52, 56 for lift or sustentation purposes as above mentioned, the aircraft is capable of very effective vertical positional control so that it may be operated in a safe manner even by relatively inexperienced persons. The hovering ability and slow speed of forward travel render the aircraft particularly suitable for observation and rescue work, and if desired, suitable equipment such as winches, etc., may be provided in the cabin 21 for lowering and raising material, supplies, etc., to and from the ground.

As already noted, the stabilizer flaps 56 may be swung upwardly to the position 56a for lifting effect at the tail empennage of the airplane. Moreover, these flaps may also be swung downwardly to the position 56b, in which event the tail of the airplane will be urged downwardly by the rearwardly directed air stream occurring during flight and the nose of the airplane will be directed upwardly as the result of downward movement of the tail. In this manner the aircraft will attain a high degree of maneuverability at slow speeds, and efficient positional control in the air.

It will be apparent from the foregoing that the invention is well suited for use in transport to and from poorly accessible locations where other forms of transportation would not be possible. As such, the airplane requires very short runways for take-off and landing, or no runways at all if a direct ascent or descent is made by full utilization of the lifting power afforded by the flaps 52, 56. These features, combined with the light weight construction of the airplane and the very small amount of engine power which is needed, render the aircraft well adapted for all work where speed of travel is of secondary consideration.

Although in the foregoing there has been described and shown the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claims.

What is claimed as new is:

1. An airfoil section for an airplane provided with a through air passage extending between the upper and lower surfaces thereof, and a lift producing flap disposed in said air passage and of substantially the same size as said air passage, as seen in top plan view, said flap being hinged at its rear edge to said airfoil section and being swingable to a forwardly and upwardly inclined position relative to said airfoil section, whereby a portion of a rearwardly directed air current relative to said airfoil section during flight will be deflected downwardly by the underside of said flap through said air passage to impart lifting action to the airfoil section, said flap being additionally selectively swingable to a forwardly and downwardly inclined position for reversing the force produced by the deflected air current relative to said airfoil section.

2. The device as defined in claim 1 together with means for swinging said flap into either of said inclined positions and locking same therein.

References Cited in the file of this patent
UNITED STATES PATENTS

| | | |
|---|---|---|
| 1,471,243 | Coffin | Oct. 16, 1923 |
| 1,545,808 | Ajello | July 14, 1925 |
| 1,549,122 | Lanier | Aug. 11, 1925 |
| 2,003,223 | Rose | May 28, 1935 |
| 2,066,336 | Crouch | Jan. 5, 1937 |
| 2,480,040 | Mitchell | Aug. 23, 1949 |